US012627430B2

(12) United States Patent
Bao et al.

(10) Patent No.: US 12,627,430 B2
(45) Date of Patent: May 12, 2026

(54) REFERENCE SIGNAL TRANSMISSION METHOD AND DEVICE, COMMUNICATION NODE, AND STORAGE MEDIUM

(71) Applicant: ZTE Corporation, Shenzhen (CN)

(72) Inventors: Tong Bao, Shenzhen (CN); Yu Xin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 438 days.

(21) Appl. No.: 18/028,055

(22) PCT Filed: Sep. 8, 2021

(86) PCT No.: PCT/CN2021/117213
§ 371 (c)(1),
(2) Date: Mar. 23, 2023

(87) PCT Pub. No.: WO2022/062904
PCT Pub. Date: Mar. 31, 2022

(65) Prior Publication Data
US 2023/0344577 A1 Oct. 26, 2023

(30) Foreign Application Priority Data
Sep. 28, 2020 (CN) .......................... 202011043278.9

(51) Int. Cl.
*H04L 5/00* (2006.01)
*H04L 27/26* (2006.01)
(52) U.S. Cl.
CPC ........ *H04L 5/0048* (2013.01); *H04L 27/2628* (2013.01)

(58) Field of Classification Search
CPC .......................... H04L 5/0048; H04L 27/2628
See application file for complete search history.

(56) References Cited

U.S. PATENT DOCUMENTS

| | | | |
|---|---|---|---|
| 9,325,470 B2 | 4/2016 | Li | |
| 2010/0020890 A1 | 1/2010 | Choi et al. | |
| 2018/0146329 A1* | 5/2018 | Seibert | .................. H04L 5/0007 |
| 2020/0145272 A1 | 5/2020 | Choi | |

FOREIGN PATENT DOCUMENTS

| | | |
|---|---|---|
| CN | 101340228 A | 1/2009 |
| CN | 102916920 A | 2/2013 |
| CN | 104125184 A | 10/2014 |

(Continued)

OTHER PUBLICATIONS

European Search Report for corresponding application EP21871276; Mail date Oct. 1, 2024.

(Continued)

*Primary Examiner* — Duc C Ho
(74) *Attorney, Agent, or Firm* — CANTOR COLBURN LLP

(57) ABSTRACT

Provided are a reference signal transmission method and apparatus, a communication node, and a storage medium. The method includes transmitting a first reference signal through the first H symbols of a physical resource block in the time domain, where H is greater than or equal to 2; and transmitting a second reference signal through the last T symbols of the physical resource block in the time domain, where T is greater than or equal to H.

20 Claims, 6 Drawing Sheets

Transmit a first reference signal through the first H symbols of a physical resource block in the time domain, where H is greater than or equal to 2 — 110

Transmit a second reference signal through the last T symbols of the physical resource block in the time domain, where T is greater than or equal to H — 120

(56)            References Cited

FOREIGN PATENT DOCUMENTS

| CN | 106717089 | A | 5/2017 | | |
| CN | 107612859 | A | 1/2018 | | |
| CN | 107734660 | A | 2/2018 | | |
| CN | 108365935 | A | 8/2018 | | |
| CN | 112134676 | A | 12/2020 | | |
| WO | 2017121410 | A1 | 7/2017 | | |
| WO | 2017155276 | A1 | 9/2017 | | |
| WO | 2018101863 | A1 | 6/2018 | | |
| WO | WO-2019129018 | A1 * | 7/2019 | .......... | H04L 5/0048 |

OTHER PUBLICATIONS

Chinese Office Action for corresponding application 2020110432789; Report dated Jan. 24, 2025.
Chinese Search Report for corresponding application 2020110432789; Report dated Jan. 23, 2025.

* cited by examiner

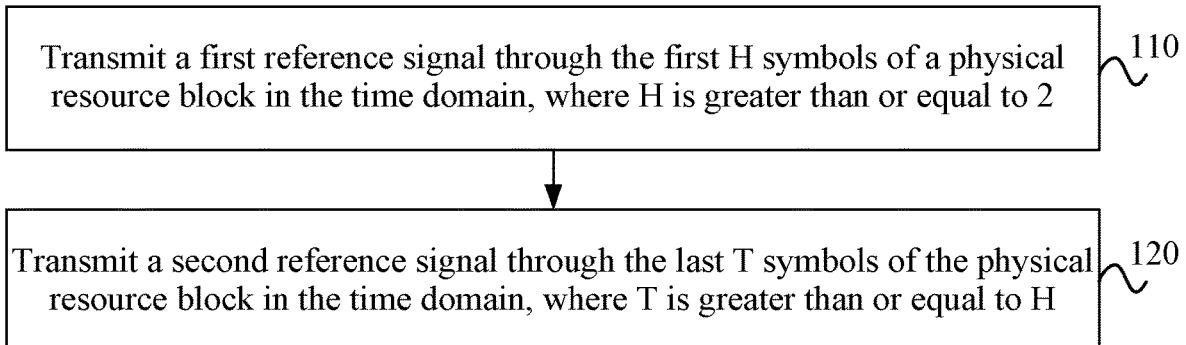

Transmit a first reference signal through the first H symbols of a physical resource block in the time domain, where H is greater than or equal to 2 ∿110

Transmit a second reference signal through the last T symbols of the physical resource block in the time domain, where T is greater than or equal to H ∿120

FIG. 1

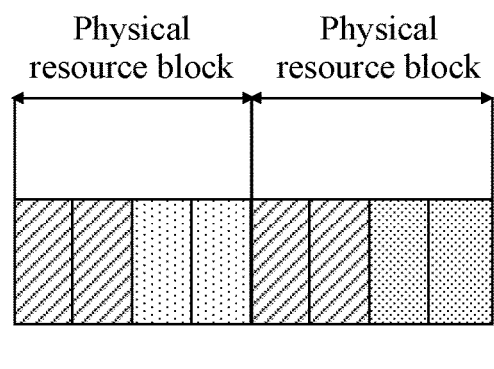

Physical resource block      Physical resource block

FIG. 2

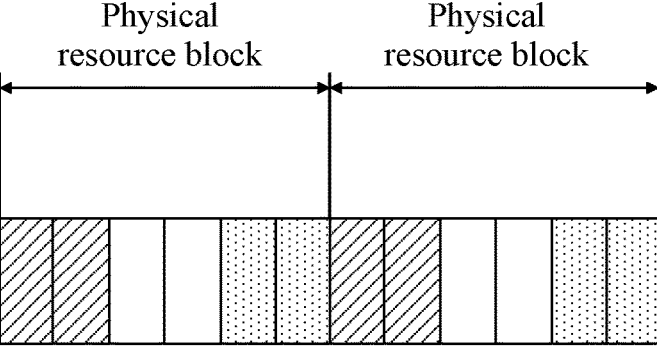

Physical resource block      Physical resource block

FIG. 3

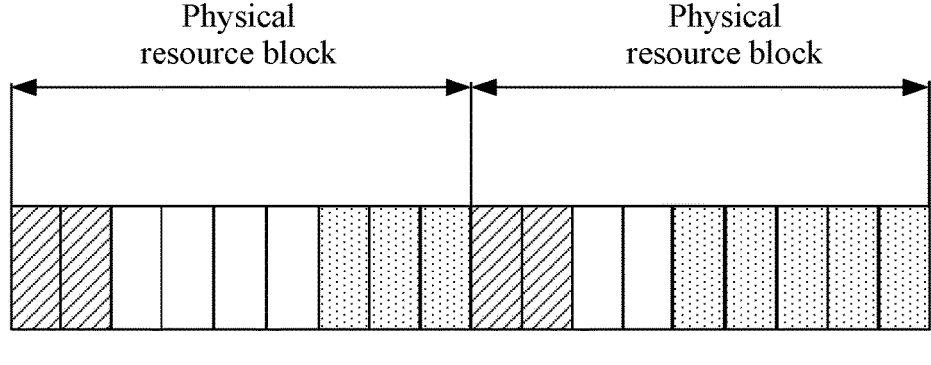
FIG. 4
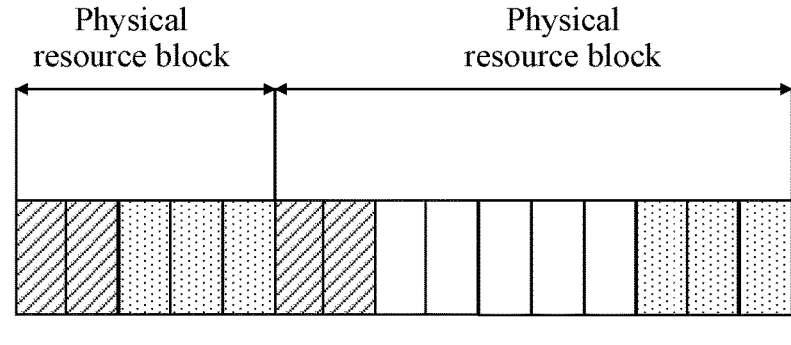
FIG. 5
FIG. 6

REFERENCE SIGNAL TRANSMISSION METHOD AND DEVICE, COMMUNICATION NODE, AND STORAGE MEDIUM

CROSS-REFERENCE TO RELATED APPLICATIONS

This is a National Stage Application, filed under 35 U.S.C. 371, of International Patent Application No. PCT/CN2021/117213, filed on Sep. 8, 2021, which claims priority to Chinese Patent Application No. 202011043278.9 filed with the China National Intellectual Property Administration (CNIPA) on Sep. 28, 2020, the disclosures of which are incorporated herein by reference in their entireties.

TECHNICAL FIELD

The present application relates to the field of wireless communication networks, for example, a reference signal transmission method, a communication node, and a storage medium.

BACKGROUND

Long term evolution (LTE) uses the technology of orthogonal frequency division multiplexing (OFDM), and time-frequency resources composed of subcarriers and OFDM symbols constitute wireless physical time-frequency resources of an LTE system. In the technology of OFDM, a cyclic prefix (CP) can well solve the problem of multipath delay of a CP-OFDM system, but a CP-OFDM spectrum has a large out-of-band leakage, making CP-OFDM sensitive to frequency and time offsets between adjacent subbands, easily causing inter-subband interference. An LTE system uses guard intervals in the frequency domain, resulting in a lower spectral efficiency. Therefore, new technologies are required to suppress the out-of-band leakage. As a carrier frequency in a terahertz scenario increases, phase noise becomes larger, but the design of a phase tracking reference signal (PTRS) cannot satisfy the requirement for estimation of larger phase noise in the terahertz scenario.

SUMMARY

The present application provides a reference signal transmission method and apparatus, a communication node, and a storage medium to satisfy the requirement for estimating the phase noise and improve the demodulation performance of a receiving end.

An embodiment of the present application provides a reference signal transmission method. The method includes transmitting a first reference signal through the first H symbols of a physical resource block in the time domain, where H is greater than or equal to 2; and transmitting a second reference signal through the last T symbols of the physical resource block in the time domain, where T is greater than or equal to H.

An embodiment of the present application provides a reference signal transmission apparatus. The apparatus includes a first transmission module and a second transmission module.

The first transmission module is configured to transmit a first reference signal through the first H symbols of a physical resource block in the time domain, where H is greater than or equal to 2. The second transmission module is configured to transmit a second reference signal through the last T symbols of the physical resource block in the time domain, where T is greater than or equal to H.

An embodiment of the present application provides a communication node. The communication node includes one or more processors and a storage apparatus configured to store one or more programs. When the one or more programs are executed by the one or more processors, the one or more processors perform the preceding reference signal transmission method.

An embodiment of the present application provides a computer-readable storage medium storing a computer program which, when executed by a processor, causes the processor to perform the preceding reference signal transmission method.

BRIEF DESCRIPTION OF DRAWINGS

FIG. 1 is a flowchart of a reference signal transmission method according to an embodiment.

FIG. 2 is a diagram illustrating transmission of reference signals through physical resource blocks according to an embodiment.

FIG. 3 is a diagram illustrating transmission of reference signals through physical resource blocks according to another embodiment.

FIG. 4 is a diagram illustrating transmission of reference signals through physical resource blocks according to another embodiment.

FIG. 5 is a diagram illustrating transmission of reference signals through physical resource blocks according to another embodiment.

FIG. 6 is a diagram illustrating transmission of reference signals through physical resource blocks according to another embodiment.

DETAILED DESCRIPTION

Figure 7:
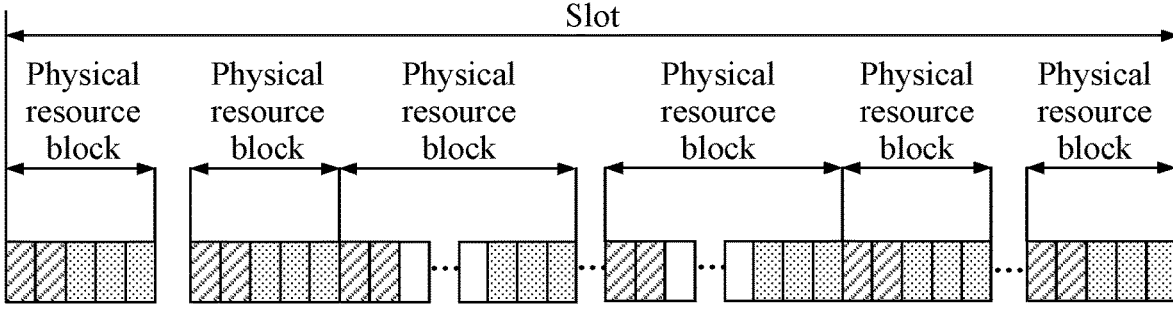
FIG. 7 is a diagram illustrating transmission of reference signals through physical resource blocks according to another embodiment.

The present application is described hereinafter in conjunction with drawings and embodiments. The embodiments described herein are intended to explain the present application. For ease of description, the drawings illustrate only parts related to the present application.

In an embodiment of the present application, a reference signal transmission method is provided. The method is applicable to a communication node. The communication node may be, for example, a base station, an access point (AP), a transmission receive point (TRP), or a user equipment (UE). For example, a UE is used as a sending end of a reference signal to send a first reference signal through the first H (H≥2) symbols of each physical resource block and send a second reference signal through the last T (T≥H) symbols of each physical resource block; and a base station is used as a receiving end of a reference signal to receive corresponding reference signals through the first H symbols and the last T symbols of each physical resource block. The first reference signal and the second reference signal are used by the receiving end to perform, for example, phase noise estimation and compensation, frequency offset correction, auxiliary channel estimation, and auxiliary synchronization to satisfy the requirement for estimation of the phase noise, thereby improving the demodulation performance of the receiving end.

FIG. 1 is a flowchart of a reference signal transmission method according to an embodiment. The method is applicable to a communication node. As shown in FIG. 1, the method of this embodiment includes 110 and 120.

In 110, a first reference signal is transmitted through the first H symbols of a physical resource block in the time domain, where H is greater than or equal to 2.

In 120, a second reference signal is transmitted through the last T symbols of the physical resource block in the time domain, where T is greater than or equal to H.

In this embodiment, a first reference signal is transmitted through the first H symbols of a physical resource block in the time domain, and a second reference signal is transmitted through the last T symbols of the physical resource block in the time domain. Here the physical resource block is a resource unit consisting of several symbols in the time domain and several subcarriers in the frequency domain, where the symbols refer to OFDM symbols. On this basis, the sending end can provide more accurate information for the receiving end; and the receiving end can perform, for example, phase noise estimation and compensation, frequency offset correction, channel estimation, and synchronization according to the first reference signal and the second reference signal, thereby improving the demodulation performance of the receiving end.

In an embodiment, the first reference signal corresponding to the first H symbols of the physical resource block is the same as a reference signal corresponding to the first H symbols of the next physical resource block adjacent to the physical resource block in the time domain.

In this embodiment, the first reference signal is transmitted through the first H symbols of each physical resource block, and the first reference signal transmitted on the first H symbols of the physical resource block is the same as the reference signal corresponding to the first H symbols of the next physical resource block adjacent to the physical resource block in the time domain, thereby resisting uplink and downlink interference.

In an embodiment, the second reference signal corresponding to the last T symbols of the physical resource block is the same as a reference signal corresponding to the last T symbols of the next physical resource block adjacent to the physical resource block in the time domain.

In this embodiment, the second reference signal is transmitted through the last T symbols of the physical resource block, and the second reference signal transmitted on the last T symbols of the physical resource block is the same as the reference signal corresponding to the last T symbols of the next physical resource block adjacent to the physical resource block in the time domain, thereby resisting multipath delay. In this case, the same second reference signal is transmitted on the last T symbols of at least two physical resource blocks adjacent in the time domain. This is equivalent to adding one cyclic prefix in units of symbols to consecutive physical resources. That is, in a physical resource block, the last symbols where the second reference signal is located may be used as the cyclic prefix of the next physical resource block adjacent in the time domain. In this case, a multipath component of the prior OFDM symbol does not cause interference to the next OFDM symbol, thereby effectively resisting the multipath delay. In a CP-OFDM system, transmission of the CP requires to occupy a spectrum resource, and the CP requires to be removed when the receiving end performs demodulation. As a result, the spectrum resource is wasted. However, in the method of this embodiment, no additional guard interval or cyclic prefix is required between adjacent physical resource blocks, thereby saving the transmission overhead and improving the utilization rate of spectrum resources.

In an embodiment, the first reference signal corresponding to the first H symbols of the physical resource block is the same as the reference signal corresponding to the first H symbols of the next physical resource block adjacent in the time domain; and the second reference signal corresponding to the last T symbols of the physical resource block is the same as the reference signal corresponding to the last T symbols of the next physical resource block adjacent in the time domain.

In this embodiment, the first reference signal is transmitted through the first H symbols of the physical resource block, and the first reference signal transmitted on the first H symbols of the physical resource block is the same as the reference signal corresponding to the first H symbols of the next physical resource block adjacent in the time domain, thereby resisting the uplink and downlink interference. The second reference signal is transmitted through the last T symbols of the physical resource block, and the second reference signal transmitted on the last T symbols of the physical resource block is the same as the reference signal corresponding to the last T symbols of the next physical resource block adjacent in the time domain, that is, the last reference signal symbols of the physical resource block may be regarded as the cyclic prefix of the next physical resource block adjacent in the time domain, thereby overcoming the problem of multipath delay and improving the demodulation performance of the receiving end. The first reference signal is transmitted through the first H symbols of the physical resource block, the second reference signal is transmitted through the last T symbols of the physical resource block, the first reference signal transmitted on the first H symbols of the physical resource block is the same as the reference signal corresponding to the first H symbols of the next physical resource block adjacent in the time domain, and the second reference signal transmitted on the last T symbols of the physical resource block is the same as the reference signal corresponding to the last T symbols of the next physical resource block adjacent in the time domain, thereby increasing the continuity of amplitudes and phases of adjacent physical resource blocks and reducing the out-of-band leakage. The first reference signal and the second reference signal may be used by the receiving end to perform, for example, phase noise estimation and compensation, frequency offset correction, auxiliary channel estimation, and auxiliary synchronization, thereby improving the demodulation performance of the receiving end.

In an embodiment, each slot contains L physical resource blocks, and L is greater than or equal to 1; and an $i^{th}$ physical resource block in each slot consists of $M_i$ symbols in the time domain and $K_i$ subcarriers in the frequency domain, where $M_i$ is greater than or equal to the sum of T and H, $K_i$ is greater than or equal to 1, and i is a positive integer less than or equal to L.

In this embodiment, each slot includes at least one physical resource block, and each physical resource block consists of $M_i$ symbols in the time domain and $K_i$ subcarriers in the frequency domain, where $M_i \geq H+T$. Among the $M_i$ symbols of the $i^{th}$ physical resource block, the first H symbols are configured for transmission of the first reference signal, the last T symbols are configured for transmission of the second reference signal, and the remaining $(M_i-H-T)$ symbols, if present, may be configured for transmission of related information. The first reference signal transmitted on the first H symbols of the $i^{th}$ physical resource block is the same as a reference signal corresponding to the first H symbols of the next physical resource block adjacent in the time domain, that is, the same as the first reference signal transmitted on the first H symbols of an $(i+1)^{th}$ physical resource block. The second reference signal transmitted on the last T symbols of the $i^{th}$ physical resource block is the same as a reference signal corresponding to the last T symbols of the next physical resource block adjacent in the time domain, that is, the same as the second reference signal transmitted on the last T symbols of the $(i+1)^{th}$ physical resource block. Assuming that each slot contains only one physical resource block, then the first reference signal transmitted on the first H symbols of this physical resource block is the same as the first reference signal transmitted on the first H symbols of the physical resource block contained in the next adjacent slot in the time domain; and the second reference signal transmitted on the last T symbols of this physical resource block is the same as the second reference signal transmitted on the last T symbols of the physical resource block contained in the next adjacent slot in the time domain. Here different physical resource blocks may contain the same number of symbols or different numbers of symbols.

In an embodiment, among the L physical resource blocks in each slot, P physical resource blocks each contain (T+H) symbols, and (L–P) physical resource blocks each contain more than (T+H) symbols, where P is greater than or equal to 0 and less than or equal to L.

In this embodiment, each slot contains L physical resource blocks. P physical resource blocks in the L physical resource blocks each contain (H+T) symbols, that is, no remaining symbol capable of being configured for transmission of related information exists; in this case, the P physical resource blocks are reference signal blocks. The (L–P) physical resource blocks each contain more than (H+T) symbols, that is, the remaining symbol capable of being configured for transmission of related information exists; in this case, these (L–P) physical resource blocks are data blocks.

In an embodiment, when P is equal to 0, in each physical resource block in each slot, the first H symbols in the time domain are configured for transmission of the first reference signal, the last T symbols in the time domain are configured for transmission of the second reference signal, and a symbol other than the first H symbols and the last T symbols in the time domain is configured for transmission of related information. When P is equal to L, in each physical resource block in each slot, the first H symbols in the time domain are configured for transmission of the first reference signal and the last T symbols in the time domain are configured for transmission of the second reference signal, and no related information is contained in the physical resource blocks. When P is greater than 0 and less than L, in each of the P physical resource blocks in each slot, the first H symbols in the time domain are configured for transmission of the first reference signal, the last T symbols in the time domain are configured for transmission of the second reference signal, and no related information is contained in the P physical resource blocks; and in each of (L–P) physical resource blocks in each slot, the first H symbols in the time domain are configured for transmission of the first reference signal, the last T symbols in the time domain are configured for transmission of the second reference signal, and a symbol other than the first H symbols and the last T symbols in the time domain is configured for transmission of related information, where the related information includes at least one of traffic data or a third reference signal.

FIG. 2 is a diagram illustrating transmission of reference signals through physical resource blocks according to an embodiment. As shown in FIG. 2, each physical resource block contains $M_i$ ($M_i=4$) symbols (i=1, 2), where the first H (H=2) symbols (indicated by the slash region) are configured for transmission of the first reference signal, and the last T (T=2) symbols (indicated by the dot region) are configured for transmission of the second reference signal, where $M_i=T+H$, and T=H. The reference signal on the first H symbols of a physical resource block is the same as the reference signal on the first H symbols of the next physical resource block adjacent in the time domain. The reference signal on the last T symbols of the physical resource block is the same as the reference signal on the last T symbols of the next physical resource block adjacent in the time domain. Each physical resource block is a reference signal block on which no related information is transmitted.

FIG. 3 is a diagram illustrating transmission of reference signals through physical resource blocks according to another embodiment. As shown in FIG. 3, each physical resource block contains $M_i$ ($M_i=6$) symbols (i=1, 2), where the first H (H=2) symbols (indicated by the slash region) are configured for transmission of the first reference signal, the last T (T=2) symbols (indicated by the dot region) are configured for transmission of the second reference signal, and the intermediate $(M_i-T-H)$ $((M_i-T-H)=2)$ symbols (indicated by the blank block region) are configured for transmission of related information, for example, traffic data, where $M_i > T+H$, and T=H. The reference signal on the first H symbols of a physical resource block is the same as the reference signal on the first H symbols of the next physical resource block adjacent in the time domain. The reference signal on the last T symbols of the physical resource block is the same as the reference signal on the last T symbols of the next physical resource block adjacent in the time domain. Each physical resource block is a data block configured for transmission of both a reference signal and traffic data.

FIG. 4 is a diagram illustrating transmission of reference signals through physical resource blocks according to another embodiment. As shown in FIG. 4, the $i^{th}$ (1=1) physical resource block contains $M_1$ ($M_1=9$) symbols, where the first H (H=2) symbols (indicated by the slash region) are configured for transmission of the first reference signal, and the last T (T=3) symbols (indicated by the dot region) are configured for transmission of the second reference signal, where $M_1 > T+H$, and T>H. As shown in FIG. 4, the $i^{th}$ (1=2) physical resource block contains $M_2$ ($M_2=9$) symbols, where the first H (H=2) symbols (indicated by the slash region) are configured for transmission of the first reference signal, and the last T' (T'=5) symbols (indicated by the dot region) are configured for transmission of the second reference signal, where $M_2 > T'+H$, and T'>H. The first reference signal transmitted on the first 2 symbols of the $1^{st}$ physical resource block is the same as the first reference signal corresponding to the first 2 symbols of the next physical resource block adjacent in the time domain. The second reference signal transmitted on the last 3 symbols of the Pt physical resource block is the same as the second reference signal transmitted on the last 3 symbols of the next physical resource block adjacent in the time domain. In the Pt physical resource block, 4 symbols other than the first 2 symbols and the last 3 symbols may be configured for transmission of other related information, for example, traffic data (indicated by the blank block region) and the third reference signal. The last 5 symbols in the $2^{nd}$ physical resource block transmit the reference signal, providing a longer cyclic prefix for the next physical resource block adjacent to the $2^{nd}$ physical resource block in the time domain and overcoming the problem of multipath delay to a greater extent. In this embodiment, the reference signal on the first H symbols of a physical resource block is the same as the reference signal on the first H symbols of the next physical resource block adjacent in the time domain, and the reference signal on the last T symbols of the physical resource block is the same as the reference signal on the last T symbols of the next physical resource block adjacent in the time domain. Each physical resource block is a data block configured for transmission of both the reference signal and traffic data.

FIG. 5 is a diagram illustrating transmission of reference signals through physical resource blocks according to another embodiment. As shown in FIG. 5, the $i^{th}$ (1=1) physical resource block contains $M_1$ ($M_1$=5) symbols, where the first H (H=2) symbols (indicated by the slash region) are configured for transmission of the first reference signal, and the last T (T=3) symbols (indicated by the dot region) are configured for transmission of the second reference signal, where $M_1$=T+H, and T>H. As shown in FIG. 5, the $i^{th}$ (i=2) physical resource block contains $M_2$ ($M_2$=10) symbols, where the first H (H=2) symbols (indicated by the slash region) are configured for transmission of the first reference signal, the last T (T=3) symbols (indicated by the dot region) are configured for transmission of the second reference signal, and the intermediate ($M_2$−T−H) (($M_2$−T−H)=5) symbols (indicated by the blank block region) may be configured for transmission of other related information, for example, traffic data, where $M_2$>T+H, and T>H. The first reference signal transmitted on the first H symbols of a physical resource block is the same as the first reference signal transmitted on the first H symbols of the next physical resource block adjacent in the time domain. The second reference signal on the last T symbols of the physical resource block is the same as the second reference signal on the last T symbols of the next physical resource block adjacent in the time domain. The $1^{st}$ physical resource block is a reference signal block, and the $2^{nd}$ physical resource block is a data block.

In an embodiment, among two physical resource blocks adjacent in the time domain, the length of the latter is an integer multiple of the length of the former. For example, in FIG. 5, the length of the $2^{nd}$ physical resource block is twice the length of the $1^{st}$ physical resource block.

FIG. 6 is a diagram illustrating transmission of reference signals through physical resource blocks according to another embodiment. As shown in FIG. 6, one slot contains L (L=1) physical resource block, and one physical resource block (or one slot) contains $M_i$ ($M_i$=14) symbols (i=1). H (H=2) symbols located in the front most of each slot in the time domain transmit the first reference signal, T (T=3) symbols located in the back most of each slot in the time domain transmit the second reference signal, ($M_i$−T−H) (($M_i$−T−H)=9) symbols located in the middle of each slot in the time domain transmit other related information, for example, traffic data. The first reference signal on the first H symbols in each slot is the same as the first reference signal on the first H symbols in the next slot adjacent in the time domain. The second reference signal on the last T symbols in each slot is the same as the second reference signal on the last T symbols in the next slot adjacent in the time domain. Here $M_1$>T+H, and T>H.

FIG. 7 is a diagram illustrating transmission of reference signals through physical resource blocks according to another embodiment. As shown in FIG. 7, one slot contains L physical resource blocks, in which P physical resource blocks each contain (T+H) symbols, and (L−P) physical resource blocks each contain more than (T+H) symbols, where L≥P≥0. In FIG. 7, the P physical resource blocks each contain (T+H) ((T+H)=5) symbols, where the first H (H=2) symbols transmit the first reference signal, and the last T (T=3) symbols transmit the second reference signal. The P physical resource blocks are each a reference signal block. In FIG. 7, the (L−P) physical resource blocks each contain more than (T+H) symbols, where the first H (H=2) symbols transmit the first reference signal, the last T (T=3) symbols transmit the second reference signal, and the remaining ($M_i$−T−H) symbols are configured for transmission of other related information, for example, traffic data. The (L−P) physical resource blocks are each a data block. The L physical resource blocks are the same in terms of the first reference signal on the first 2 (H=2) symbols. The L physical resource blocks are the same in terms of the second reference signal on the last 3 (T=3) symbols. Some of the P physical resource blocks are located at the front most of the slot, and the remainder of the P physical resource blocks are located at the back most of the slot. The (L−P) physical resource blocks may be located in the middle of the slot.

In an embodiment, the method also includes 1010, 1020, and 1030.

In 1010, an inverse fast Fourier transform (IFFT) is performed on frequency-domain data of each symbol in the physical resource block so that oversampled time-domain data of each symbol is obtained.

In 1020, the oversampled time-domain data of each symbol is modulated by using a waveform function, where the interval of an independent variable of the waveform function has the length of the product of N and T1, the modulated time-domain data sequence of each symbol has the length of the product of N and T1, N is a real number greater than 1, and T1 is a positive number.

In 1030, the modulated time-domain data sequence of each symbol is sequentially delayed by T1 based on the time-domain data sequence of the previous adjacent symbol so that the spacing between adjacent symbols of the physical resource block is T1; and the delayed time-domain data sequence of each symbol is superposed.

Figure 8:
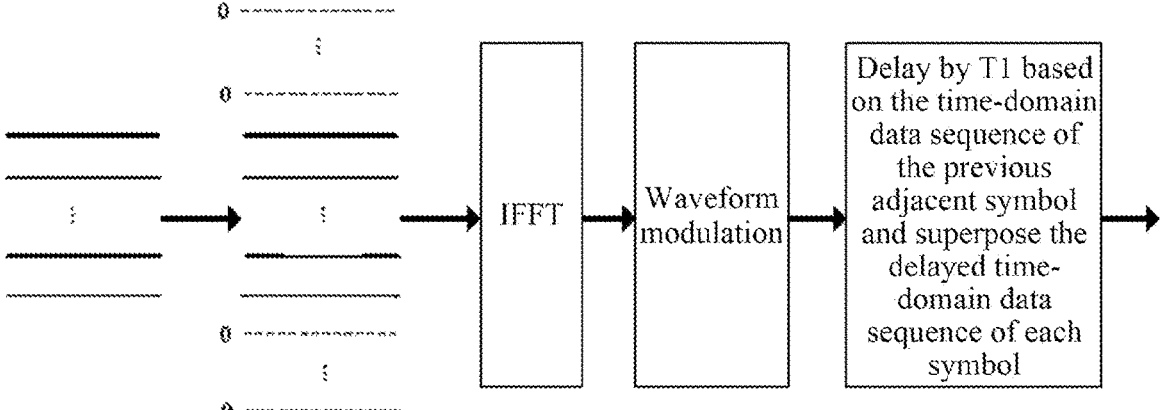
FIG. 8 is a diagram illustrating modulation of $M_i$ symbols of a physical resource block in the time domain according to an embodiment.

FIG. 8 is a diagram illustrating modulation of $M_i$ symbols of a physical resource block in the time domain according to an embodiment.

As shown in FIG. 8, each horizontal line indicates a subcarrier, where each solid line indicates a subcarrier that carries data, and each dashed line indicates a subcarrier that carries no data, that is, carries zero data. Zero data is added to subcarriers on the two sides of frequency-domain data of the $M_i$ symbols of the physical resource block in the time domain; the IFFT is performed so that oversampled time-domain data is obtained; then waveform modulation is performed so that an (N×T1)-long time-domain data sequence corresponding to each of the $M_i$ symbols is obtained; the modulated time-domain data sequence of each symbol is sequentially delayed (or staggered) by T1 based on the time-domain data sequence of the previous adjacent symbol; and then the delayed time-domain data sequence of each symbol is superposed.

Figure 9:
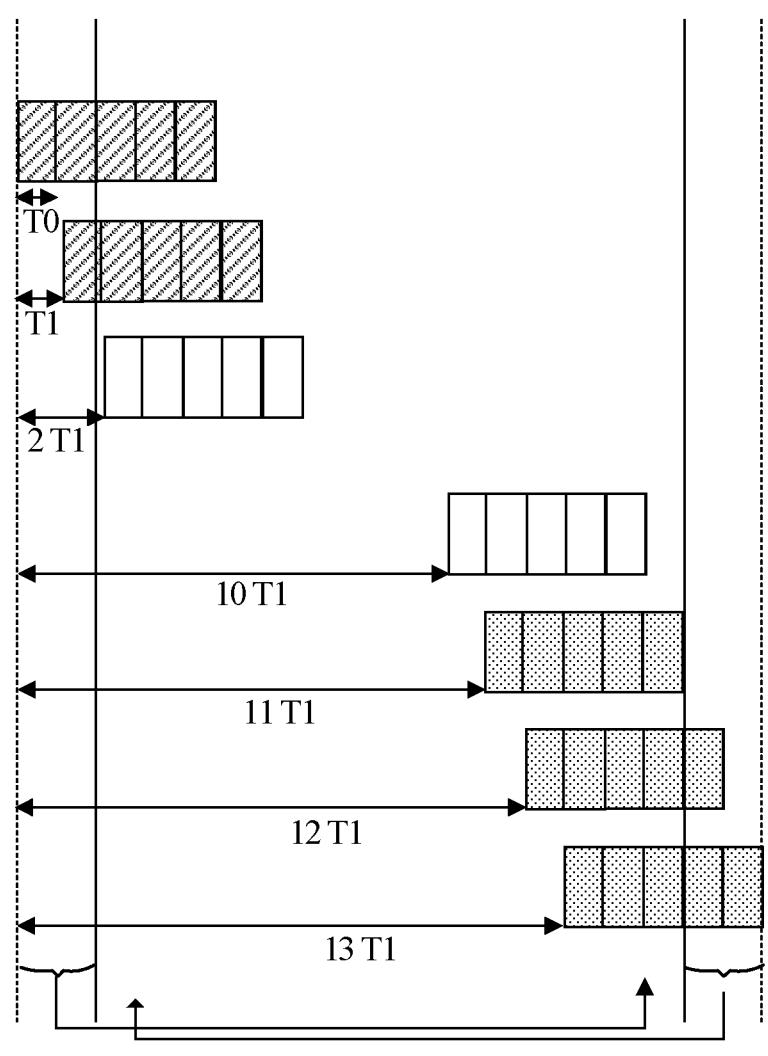
FIG. 9 is a diagram illustrating superposition of time-domain data sequences of $M_i$ symbols according to an embodiment.

FIG. 9 is a diagram illustrating superposition of time-domain data sequences of $M_i$ symbols according to an embodiment.

In this embodiment, each physical resource block contains $M_i$ ($M_i$=14) symbols in the time domain, where the first H (H=2) symbols transmit the first reference signal, the last T (T=3) symbols transmit the second reference signal, and the intermediate ($M_i$–T–H) (($M_i$–T–H)=9) symbols transmit traffic data. The reciprocal of the subcarrier spacing of the 14 symbols is T0.

The five blocks (indicated by the slash region) in the first row indicate the time-domain data sequence (obtained by waveform modulation of time-domain data on the first symbol) of the first symbol. The five blocks (indicated by the slash region) in the second row indicate the time-domain data sequence (obtained by waveform modulation of time-domain data on the second symbol) of the second symbol. The time-domain data sequence of the second symbol is T1 delayed than the time-domain data sequence of the first symbol. The five blocks (indicated by the blank region) in the third row indicate the time-domain data sequence (obtained by waveform modulation of time-domain data on the third symbol) of the third symbol. The time-domain data sequence of the third symbol is T1 delayed than the time-domain data sequence of the second symbol. That is, the time-domain data sequence of the third symbol is 2T1 delayed than the time-domain data sequence of the first symbol. Similarly, the five blocks (indicated by the dot region) in the last row indicate the time-domain data sequence (obtained by waveform modulation of time-domain data on the $14^{th}$ symbol) of the $14^{th}$ symbol. The time-domain data sequence of the $14^{th}$ symbol is T1 delayed than the time-domain data sequence of the $13^{th}$ symbol. That is, the time-domain data sequence of the $14^{th}$ symbol is 13T1 delayed than the time-domain data sequence of the first symbol. Among which, the first reference signal is transmitted on the first 2 symbols, and the second reference signal is transmitted on the last 3 symbols. The first reference signal transmitted on the first 2 symbols of a physical resource block is the same as the first reference signal transmitted on the first H symbols of the next physical resource block adjacent in the time domain. The second reference signal on the last 3 symbols of the physical resource block is the same as the second reference signal on the last T symbols of the next physical resource block adjacent in the time domain.

In FIG. 9, the distance between the two vertical solid lines indicates the length of one physical resource block, and the two vertical dashed lines indicate the overall start position of the physical resource block and the overall end position of the physical resource block respectively after all symbols of the physical resource block are waveform-modulated. In the superposing process, it is feasible to superpose a time-domain data sequence having a length extending backwards from the overall start position (the left vertical dashed line) onto a region having the same length extending forwards from the end position (the right vertical solid line) of the length of the physical resource block and superpose a time-domain data sequence having a length extending forwards from the overall end position (the right vertical dashed line) onto a region having the same length extending backwards from the start position (the left vertical solid line) of the length of the physical resource block, thereby ensuring that the length of the one physical resource block is unchanged, that is, a cyclic superposition. Alternatively, waveform-modulated time-domain data sequences of the $M_i$ symbols may be linearly superposed. Time-domain data sequences exceeding the length of the physical resource block are superposed onto the previous adjacent physical resource block and the next adjacent physical resource block respectively.

In an embodiment, the waveform modulation means that time-domain data of each symbol of the physical resource block is copied every T0 first to obtain (5×T0)-long time-domain data corresponding to each symbol. Additionally, before delay and superposition, dot multiplication is performed on a discrete function value of the set waveform function and the (5×T0)-long data sequence of each symbol to implement the waveform modulation so as to obtain a (5×T0)-long waveform-modulated time-domain data sequence corresponding to each of the 14 symbols.

As shown in FIG. 9, 14 waveform-modulated time-domain data sequences each of which has the length of (5×T0) are delayed (or staggered) by T1 sequentially and then superposed in the time domain to obtain a time-domain data sequence having the length of (13×T1+5T0). The time-domain data sequence having the length of (13×T1+5T0) is cut out using the length (two solid lines) of the physical resource block. Time-domain data sequences before and after the two solid lines are respectively superposed onto the rearmost and the frontmost of the region between the two solid lines so that the cut time-domain data sequence maintains the length of (14×T1), that is, the length of the physical resource block maintains 14×T1, where T1>T0. In this embodiment, the length of the waveform-modulated time-domain data of each symbol is 5×T0, and 5×T0=5T0/T1×T1, that is, N=5T0/T1.

In an embodiment, the L physical resource blocks in each slot contain the same number of subcarriers and have the same subcarrier spacing.

In an embodiment, T1 is greater than T0, or T1 is less than or equal to T0, where T0 is the reciprocal of the subcarrier spacing.

In an embodiment, when T1 is greater than T0, T1 is a times T0, where a has the value range of [15/14, 2] or [8/7, 2].

In this embodiment, the value of T1 is $$\frac{15}{14}T0$$

to 2T0 or is 8/7T0 to 2T0.

In an embodiment, the method also includes 1001.

In 1001, zero data is added to multiple subcarriers on two sides of subcarriers in the physical resource block in the frequency domain. In this embodiment, zero data is added so that oversampling is implemented.

In an embodiment, the waveform function includes one of a root raised cosine function, a raised cosine function, a piecewise function, or a rectangular function. The raised cosine function is a time-domain raised cosine function or is a time-domain function transformed from a frequency-domain raised cosine function by using the IFFT. The root raised cosine function is a time-domain root raised cosine function or is a time-domain function transformed from a frequency-domain root raised cosine function by using the IFFT. The non-zero function value of the piecewise function is represented by a combination of multiple data expressions in different intervals of the independent variable.

Figure 10:
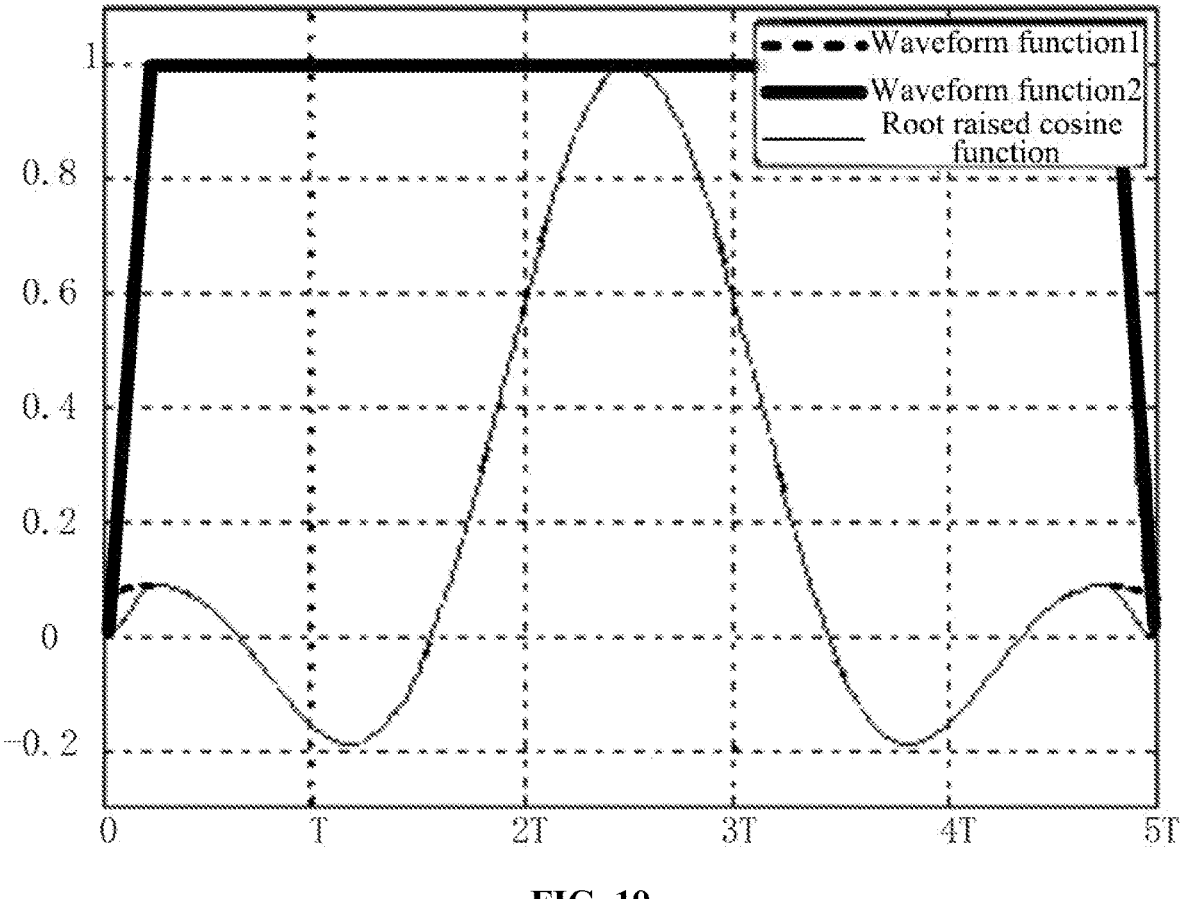
FIG. 10 is a diagram of waveform functions according to an embodiment.

FIG. 10 is a diagram of waveform functions according to an embodiment. As shown in FIG. 10, the thin solid line indicates a spread root raised cosine function, waveform function 1 indicated by the dashed line is a time-domain function transformed from a frequency-domain root raised cosine function by using the IFFT, and waveform function 2 indicated by the thick solid line is a time-domain raised cosine function.

In an embodiment, the maximum time span of the interval of the independent variable corresponding to a non-zero function value of the waveform function is greater than T1; or the maximum time span of the interval of the independent variable corresponding to a non-zero function value of the waveform function is equal to 5T1.

In an embodiment, 1020 includes copying the over-sampled time-domain data of each symbol every T0 to obtain a data sequence that corresponds to each symbol and whose length is the product of N and T1, where T0 is the reciprocal of the subcarrier spacing; and calculating the dot product of a discrete function value of the waveform function and the data sequence that corresponds to each symbol and whose length is the product of N and T1 to obtain the corresponding waveform-modulated time-domain data sequence whose length is the product of N and T1.

In this embodiment, the process of obtaining a waveform-modulated time-domain data sequence by dot multiplication may be construed as a windowing process.

In an embodiment, the waveform function is a continuous function, the discrete function value of the waveform function is obtained by sampling values of the continuous function, and the interval of the sampling is equal to a time interval between adjacent discrete data in the time-domain data of each symbol; or the waveform function is a discrete function, the number of discrete function values of the waveform function is the same as the number of pieces of discrete data in the time-domain data sequence that corresponds to each symbol and whose length is the product of N and T1.

In an embodiment, each slot contains L physical resource blocks, and L is greater than or equal to 1; the L physical resource blocks in each slot are modulated using the same waveform function; the L physical resource blocks are the same in terms of the reference signal on the last T symbols; and physical resource blocks in different slots are modulated using the same waveform function or different waveform functions.

Figure 11:
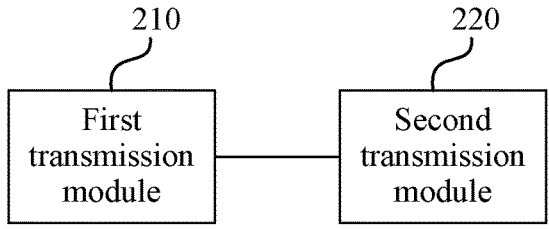
FIG. 11 is a block diagram of a reference signal transmission apparatus according to an embodiment.

An embodiment of the present application provides a reference signal transmission apparatus. FIG. 11 is a block diagram of a reference signal transmission apparatus according to an embodiment. As shown in FIG. 11, the reference signal transmission apparatus includes a first transmission module 210 and a second transmission module 220.

The first transmission module 210 is configured to transmit a first reference signal through the first H symbols of a physical resource block in the time domain, where H is greater than or equal to 2. The second transmission module 220 is configured to transmit a second reference signal through the last T symbols of the physical resource block in the time domain, where T is greater than or equal to H.

In the reference signal transmission apparatus of this embodiment, the first reference signal and the second reference signal are used by a receiving end to perform, for example, phase estimation and compensation, frequency offset correction, and auxiliary channel estimation to satisfy the requirement for the estimation of phase noise, thereby improving the demodulation performance of the receiving end.

In an embodiment, the first reference signal corresponding to the first H symbols of the physical resource block is the same as a reference signal corresponding to the first H symbols of the next physical resource block adjacent to the physical resource block in the time domain.

The first reference signal is transmitted through the first H symbols of each physical resource block, and the first reference signal corresponding to the first H symbols of the physical resource block is the same as the reference signal corresponding to the first H symbols of the next physical resource block adjacent in the time domain, thereby resisting uplink and downlink interference.

In an embodiment, the second reference signal corresponding to the last T symbols of the physical resource block is the same as a reference signal corresponding to the last T symbols of the next physical resource block adjacent to the physical resource block in the time domain.

The second reference signal is transmitted through the last T symbols of each physical resource block, and the second reference signal corresponding to the last T symbols of the physical resource block is the same as the reference signal corresponding to the last T symbols of the next physical resource block adjacent in the time domain, that is, the last reference signal symbols of the physical resource block may be regarded as the cyclic prefix of the next physical resource block adjacent in the time domain, thereby overcoming the problem of multipath delay and improving the demodulation performance of the receiving end.

In an embodiment, the first reference signal corresponding to the first H symbols of the physical resource block is the same as the reference signal corresponding to the first H symbols of the next physical resource block adjacent in the time domain, and the second reference signal corresponding to the last T symbols of the physical resource block is the same as the reference signal corresponding to the last T symbols of the next physical resource block adjacent in the time domain, thereby reducing the out-of-band leakage.

In an embodiment, each slot contains L physical resource blocks, and L is greater than or equal to 1; and an $i^{th}$ physical resource block in each slot consists of $M_i$ symbols in the time domain and $K_i$ subcarriers in the frequency domain, where $M_i$ is greater than or equal to the sum of T and H, $K_i$ is greater than or equal to 1, and i is a positive integer less than or equal to L.

In an embodiment, among the L physical resource blocks in each slot, the number of symbols contained in each of P physical resource blocks is equal to the sum of T and H, and the number of symbols contained in each of (L–P) physical resource blocks is greater than the sum of T and H, where P is greater than or equal to 0 and less than or equal to L.

In an embodiment, when P is equal to 0, in each physical resource block in each slot, the first H symbols in the time domain are configured for transmission of the first reference signal, the last T symbols in the time domain are configured for transmission of the second reference signal, and symbols other than the first H symbols in the time domain and the last T symbols in the time domain are configured for transmission of related information. When P is equal to L, in each physical resource block in each slot, the first H symbols in the time domain are configured for transmission of the first reference signal, the last T symbols in the time domain are configured for transmission of the second reference signal, and no related information is contained in the physical resource block. When P is greater than 0 and less than L, in each of the P physical resource blocks in each slot, the first H symbols in the time domain are configured for transmission of the first reference signal, the last T symbols in the time domain are configured for transmission of the second reference signal, and no related information is contained in each physical resource block; and in each of the (L–P) physical resource blocks in each slot, the first H symbols in the time domain are configured for transmission of the first reference signal, the last T symbols in the time domain are configured for transmission of the second reference signal, and symbols other than the first H symbols in the time domain and the last T symbols in the time domain are configured for transmission of related information, where the related information includes at least one of traffic data or a third reference signal.

In an embodiment, the L physical resource blocks in each slot contain the same number of subcarriers and have the same subcarrier spacing.

In an embodiment, the apparatus also includes an over-sampling module, a waveform modulation module, and a superposition module.

The oversampling module is configured to perform an IFFT on frequency-domain data of each symbol of the physical resource block to obtain oversampled time-domain data of the respective symbol. The waveform modulation module is configured to modulate the oversampled time-domain data of each symbol by using a waveform function, where the interval of an independent variable of the waveform function has the length of the product of N and T1, and the modulated time-domain data sequence of each symbol has the length of the product of N and T1, where N is a real number greater than 1, and T1 is a positive number. The superposition module is configured to sequentially delay the modulated time-domain data sequence of each symbol by T1 based on the time-domain data sequence of the previous adjacent symbol so that the spacing between adjacent symbols of the physical resource block is T1; and superpose the delayed time-domain data sequence of each symbol.

In an embodiment, T1 is greater than T0, or T1 is less than or equal to T0, where T0 is the reciprocal of the subcarrier spacing.

In an embodiment, when T1 is greater than T0, T1 is a times T0, where a has the value range of [15/14, 2] or [8/7, 2].

In an embodiment, the apparatus also includes an addition module.

The addition module is configured to add zero data to multiple subcarriers on two sides of subcarriers in the physical resource block in the frequency domain.

In an embodiment, the waveform function includes one of a root raised cosine function, a raised cosine function, a piecewise function, or a rectangular function. The raised cosine function is a time-domain raised cosine function or is a time-domain function transformed from a frequency-domain raised cosine function by using the IFFT. The root raised cosine function is a time-domain root raised cosine function or is a time-domain function transformed from a frequency-domain root raised cosine function by using the IFFT. The non-zero function value of the piecewise function is represented by a combination of multiple data expressions in different intervals of the independent variable.

In an embodiment, the maximum time span of the interval of the independent variable corresponding to a non-zero function value of the waveform function is greater than T1; or the maximum time span of the interval of the independent variable corresponding to a non-zero function value of the waveform function is equal to 5T1.

In an embodiment, the waveform modulation module is configured to copy the oversampled time-domain data of each symbol every T0 to obtain a data sequence that corresponds to the respective symbol and whose length is the product of N and T1, where T0 is the reciprocal of the subcarrier spacing; and calculate the dot product of a discrete function value of the waveform function and the data sequence that corresponds to each symbol and whose length is the product of N and T1 to obtain a corresponding waveform-modulated time-domain data sequence whose length is the product of N and T1.

In an embodiment, the waveform function is a continuous function, the discrete function value of the waveform function is obtained by sampling values of the continuous function, and the interval of the sampling is equal to a time interval between adjacent discrete data in the time-domain data of each symbol; or the waveform function is a discrete function, and the number of discrete function values of the waveform function is the same as the number of pieces of discrete data in the time-domain data sequence that corresponds to each symbol and whose length is the product of N and T1.

In an embodiment, each slot contains L physical resource blocks, and L is greater than or equal to 1; the L physical resource blocks in each slot are modulated using the same waveform function; and physical resource blocks in different slots are modulated using the same waveform function or different waveform functions.

The reference signal transmission apparatus of this embodiment and the reference signal transmission method applied to the communication node and provided in the preceding embodiments belong to the same concept. For details not described in this embodiment, reference may be made to any preceding embodiment. This embodiment has the same effects as the performed reference signal transmission method applied to the second node.

An embodiment of the present application further provides a communication node. The reference signal transmission method applied to the communication node may be performed by a reference signal transmission apparatus. The apparatus may be implemented by software and/or hardware and integrated in the communication node. The communication node is a sending end or a receiving end of a reference signal.

Figure 12:
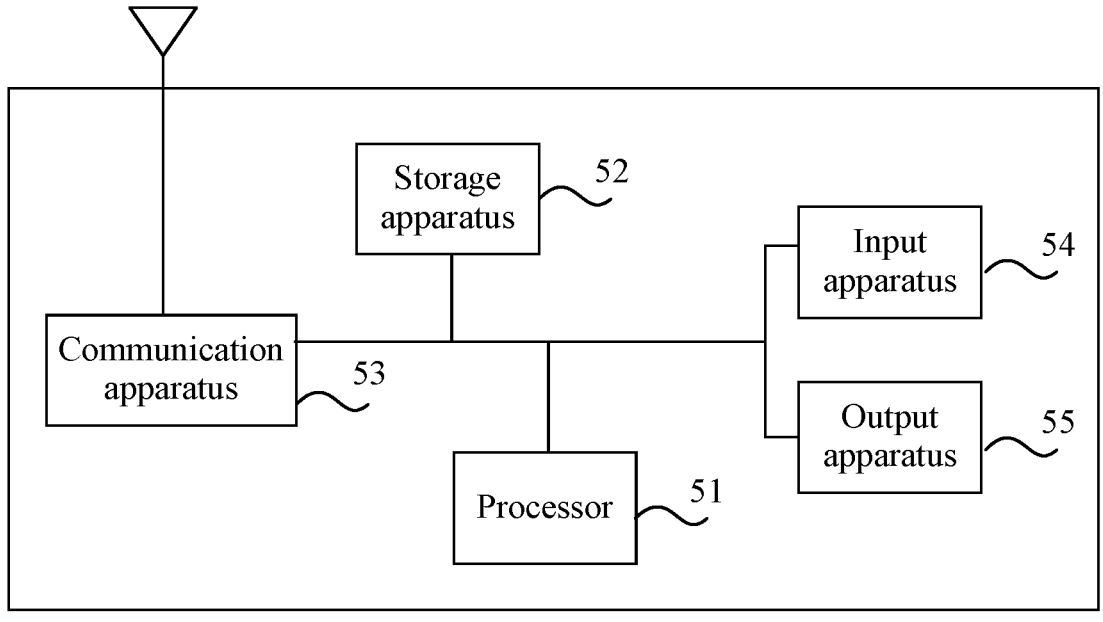
FIG. 12 is a diagram illustrating the hardware structure of a communication node according to an embodiment.

FIG. 12 is a diagram illustrating the hardware structure of a communication node according to an embodiment. As shown in FIG. 12, the communication node of the present application includes one or more processors 51 which, when executing, perform the reference signal transmission method of any embodiment of the present application. Correspondingly, the communication node may be a terminal.

The communication node may also include a storage apparatus 52. One or more processors 51 may be provided in the communication node. One processor 51 is used as an example in FIG. 12. The storage apparatus 52 is configured to store one or more programs which, when executed by the one or more processors 51, cause the one or more processors 51 to perform the reference signal transmission method of any embodiment of the present application.

The communication node also includes a communication apparatus 53, an input apparatus 54 and an output apparatus 55.

The processor 51, the storage apparatus 52, the communication apparatus 53, the input apparatus 54 and the output apparatus 55 in the communication node may be connected via a bus or other means, with connection via the bus as an example in FIG. 12.

The input apparatus 54 may be configured to receive inputted digital or character information and generate key signal input related to user settings and function control of the communication node. The output apparatus 55 may include display devices such as a display screen.

The communication apparatus 53 may include a receiver and a transmitter. The communication apparatus 53 is configured to perform information transceiving and communication under the control of the processor 51.

As a computer-readable storage medium, the storage apparatus 52 may be configured to store software programs, computer-executable programs and modules, such as program instructions/modules (for example, the first transmission module 210 and the second transmission module 220) corresponding to the reference signal transmission method according to embodiments of the present application. The storage apparatus 52 may include a program storage region and a data storage region, where the program storage region may store an operating system and an application program required by at least one function while the data storage region may store data created depending on use of the communication node. Additionally, the storage apparatus 52 may include a high-speed random-access memory and may further include a nonvolatile memory, such as at least one magnetic disk memory, a flash memory or another nonvolatile solid-state memory. In some examples, the storage apparatus 52 may include memories which are remotely disposed with respect to the processor 51. These remote memories may be connected to the communication node via a network. Examples of the preceding network include, but are not limited to, the Internet, an intranet, a local area network, a mobile communication network and a combination thereof.

An embodiment of the present application further provides a storage medium storing a computer program which, when executed by a processor, causes the processor to perform the reference signal transmission method of any embodiment of the present application. The method includes transmitting a first reference signal through the first H symbols of a physical resource block in the time domain, where H is greater than or equal to 2; and transmitting a second reference signal through the last T symbols of the physical resource block in the time domain, where T is greater than or equal to H.

A computer storage medium in the embodiment of the present application may adopt any combination of one or more computer-readable media. The computer-readable media may be computer-readable signal media or computer-readable storage media. The computer-readable storage medium may be, for example, but is not limited to, an electrical, magnetic, optical, electromagnetic, infrared, or semiconductor system, apparatus, or device, or any combination thereof. Examples of the computer-readable storage medium include (a non-exhaustive list) an electrical connection having one or more wires, a portable computer magnetic disk, a hard disk, a random access memory (RAM), a read only memory (ROM), an erasable programmable read only memory (EPROM), a flash memory, an optical fiber, a portable compact disc read only memory (CD-ROM), an optical memory device, a magnetic memory device, or any suitable combination thereof. The computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate or transmit a program used by or used in conjunction with an instruction execution system, apparatus or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case related to the remote computer, the remote computer may be connected to the user computer via any type of network including a local area network (LAN) or a wide area network (WAN) or may be connected to an external computer (for example, via the Internet through an Internet service provider).

The preceding describes example embodiments of the present application.

It is to be understood by those skilled in the art that the term "terminal" covers any suitable type of radio UE, for example, a mobile phone, a portable data processing device, a portable web browser, or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random access memory (RAM), and an optical memory device and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processing (DSP), an application specific integrated circuit (ASIC), a field-programmable gate array (FPGA) and a processor based on a multi-core processor architecture.

What is claimed is:

1. A reference signal transmission method, being executed by a communication node and comprising:

transmitting a first reference signal through first H symbols of a physical resource block in a time domain, wherein H is greater than or equal to 2; and transmitting a second reference signal through last T symbols of the physical resource block in the time domain, wherein T is greater than or equal to H;

wherein the first reference signal corresponding to the first H symbols of the physical resource block is the same as a reference signal corresponding to first H symbols of a next physical resource block adjacent to the physical resource block in the time domain.

2. The method of claim 1, wherein the second reference signal corresponding to the last T symbols of the physical resource block is the same as a reference signal corresponding to last T symbols of a next physical resource block adjacent to the physical resource block in the time domain.

3. The method of claim 1, wherein the time domain is divided into a plurality of slots, each slot of the plurality of slots contains at least one physical resource block; and an $i^{th}$ physical resource block in the at least one physical resource block consists of $M_i$ symbols in the time domain and $K_i$ subcarriers in a frequency domain, wherein $M_i$ is greater than or equal to a sum of T and H, $K_i$ is greater than or equal to 1, and i is a positive integer.

4. The method of claim 3, wherein each slot of the plurality of slots contains L physical resource blocks, and L is a positive integer greater than 1, wherein the L physical resource blocks are all reference signal blocks; or the L physical resource blocks are all data blocks; or the L physical resource blocks comprise P reference signal blocks and (L–P) data blocks, wherein P is an integer greater than 0 and less than L;

wherein a number of symbols contained in each reference signal block is equal to a sum of T and H, and a number of symbols contained in each data block is greater than the sum of T and H.

5. The method of claim 4, wherein in the each data block, first H symbols in the time domain are configured for transmission of the first reference signal, last T symbols in the time domain are configured for transmission of the second reference signal, and a symbol other than the first H symbols and the last T symbols in the time domain is configured for transmission of related information; and in the each reference signal block, first H symbols in the time domain are configured for transmission of the first reference signal and last T symbols in the time domain are configured for transmission of the second reference signal, and no related information is contained in the each physical resource block;

wherein the related information comprises at least one of traffic data or a third reference signal.

6. The method of claim 4, wherein each of the L physical resource blocks contains a same number of subcarriers and has a same subcarrier spacing.

7. The method of claim 1, further comprising:

performing an inverse fast Fourier transform (IFFT) on frequency-domain data of each symbol of the physical resource block to obtain oversampled time-domain data of the each symbol;

modulating the oversampled time-domain data of each symbol by using a waveform function, wherein an interval of an independent variable of the waveform function has a length of a product of N and T1, and a modulated time-domain data sequence of each symbol has a length of the product of N and T1, wherein N is a real number greater than 1, and T1 is a positive number; and sequentially delaying the modulated time-domain data sequence of each symbol by T1 based on a time-domain data sequence of a previous symbol adjacent to the each symbol so that a spacing between adjacent symbols of the physical resource block is T1; and superposing the delayed time-domain data sequence of each symbol.

8. The method of claim 7, wherein T1 is greater than T0, or T1 is less than or equal to T0, wherein
T0 is a reciprocal of a subcarrier spacing.

9. The method of claim 8, wherein in response to T1 being greater than T0, T1 is a times T0, wherein a has a value range of [15/14, 2] or [8/7, 2].

10. The method of claim 7, further comprising:

adding zero data to a plurality of subcarriers on two sides of subcarriers in the physical resource block in a frequency domain.

11. The method of claim 7, wherein the waveform function comprises one of a root raised cosine function, a raised cosine function, a piecewise function, or a rectangular function, wherein the raised cosine function is a time-domain raised cosine function or is a time-domain function transformed from a frequency-domain raised cosine function by using the IFFT;

the root raised cosine function is a time-domain root raised cosine function or is a time-domain function transformed from a frequency-domain root raised cosine function by using the IFFT; and a non-zero function value of the piecewise function is represented by a combination of a plurality of data expressions in different intervals of the independent variable.

12. The method of claim 7, wherein a maximum time span of the interval of the independent variable corresponding to a non-zero function value of the waveform function is greater than T1; or a maximum time span of the interval of the independent variable corresponding to a non-zero function value of the waveform function is equal to 5T1.

13. The method of claim 7, wherein modulating the oversampled time-domain data of each symbol by using the waveform function comprises:

copying the oversampled time-domain data of each symbol every T0 to obtain a data sequence that corresponds to the each symbol and whose length is the product of N and T1, wherein T0 is a reciprocal of a subcarrier spacing; and calculating a dot product of a discrete function value of the waveform function and the data sequence that corresponds to each symbol and whose length is the product of N and T1 to obtain a corresponding waveform-modulated time-domain data sequence whose length is the product of N and T1.

14. The method of claim 13, wherein the waveform function is a continuous function, wherein the discrete function value of the waveform function is obtained by sampling values of the continuous function, wherein an interval of the sampling is equal to a time interval between adjacent discrete data in the time-domain data of each symbol; or the waveform function is a discrete function, wherein a number of discrete function values of the waveform function is the same as a number of pieces of discrete data in the time-domain data sequence that corresponds to each symbol and whose length is the product of N and T1.

15. The method of claim 7, wherein the time domain is divided into a plurality of slots, each slot of the plurality of slots contains at least one physical resource block;

the at least one physical resource block is modulated using a same waveform function; and physical resource blocks in different slots in the plurality of slots are modulated using a same waveform function or different waveform functions.

16. A communication node, comprising:

at least one processor; and a storage apparatus configured to store at least one program, wherein when the at least one program is executed by the at least one processor, the at least one processor performs the following:

transmitting a first reference signal through first H symbols of a physical resource block in a time domain, wherein H is greater than or equal to 2; and transmitting a second reference signal through last T symbols of the physical resource block in the time domain, wherein T is greater than or equal to H;

wherein the first reference signal corresponding to the first H symbols of the physical resource block is the same as a reference signal corresponding to first H symbols of a next physical resource block adjacent to the physical resource block in the time domain.

17. The communication node of claim 16, wherein the second reference signal corresponding to the last T symbols of the physical resource block is the same as a reference signal corresponding to last T symbols of a next physical resource block adjacent to the physical resource block in the time domain.

18. The communication node of claim 16, wherein the time domain is divided into a plurality of slots, each slot of the plurality of slots contains at least one physical resource block; and an $i^{th}$ physical resource block in the at least one physical resource block consists of $M_i$ symbols in the time domain and $K_i$ subcarriers in a frequency domain, wherein $M_i$ is greater than or equal to a sum of T and H, $K_i$ is greater than or equal to 1, and i is a positive integer.

19. The communication node of claim 18, wherein each slot of the plurality of slots contains L physical resource blocks, and L is a positive integer greater than 1, wherein the L physical resource blocks are all reference signal blocks; or the L physical resource blocks are all data blocks; or the L physical resource blocks comprise P reference signal blocks and (L–P) data blocks, wherein P is an integer greater than 0 and less than L;

wherein a number of symbols contained in each reference signal block is equal to a sum of T and H, and a number of symbols contained in each data block is greater than the sum of T and H.

20. A non-transitory computer-readable storage medium storing a computer program which, when executed by a communication node, causes the communication node to perform the following:

transmitting a first reference signal through first H symbols of a physical resource block in a time domain, wherein H is greater than or equal to 2; and transmitting a second reference signal through last T symbols of the physical resource block in the time domain, wherein T is greater than or equal to H;

wherein the first reference signal corresponding to the first H symbols of the physical resource block is the same as a reference signal corresponding to first H symbols of a next physical resource block adjacent to the physical resource block in the time domain.

\* \* \* \* \*